United States Patent [19]

Schütze

[11] Patent Number: 4,624,874
[45] Date of Patent: Nov. 25, 1986

[54] REMOVABLE CORE FOR THE PRODUCTION OF TUBULAR STRUCTURES FROM FIBRE REINFORCED MATERIALS

[75] Inventor: Rainer Schütze, Brunswick, Fed. Rep. of Germany

[73] Assignee: Deutsche Forschungs- und Versuchsanstalt fur Luft- und Raumfahrt e. V., Cologne, Fed. Rep. of Germany

[21] Appl. No.: 759,065

[22] Filed: Jul. 24, 1985

[30] Foreign Application Priority Data

Aug. 1, 1984 [DE] Fed. Rep. of Germany ....... 3428282

[51] Int. Cl.⁴ .......................... B32B 1/08; B32B 3/26; B32B 33/00
[52] U.S. Cl. ....................................... 428/36; 156/85; 264/313; 428/71; 428/76; 428/188; 428/913
[58] Field of Search ...................... 428/319.7, 913, 36, 428/71, 76, 188; 156/84, 85, 86, 155, 175; 264/313, 317; 249/62

[56] References Cited

U.S. PATENT DOCUMENTS 3,113,897 12/1963 Honningstad et al. ............. 156/155
3,607,602 9/1971 Greskiewicz .................... 428/319.7

*Primary Examiner*—William J. Van Balen
*Attorney, Agent, or Firm*—Gottlieb, Rackman & Reisman

[57] ABSTRACT

A removable core for use in the production of tubular structures from fibre reinforced resin materials. The body of the core is composed of a foam material which softens or collapses under the action of heat sufficient to cure the resin material but is hard and cross-sectionally dimensionally stable under less heat than that. The core is provided on the outside with a heat shrunk plastic tube or hose which closely embraces the foam body and serves as a coating therefor, thereby enhancing the rigidity and stability of shape of the core and imparting thereto a smooth surface.

2 Claims, 2 Drawing Figures

REMOVABLE CORE FOR THE PRODUCTION OF TUBULAR STRUCTURES FROM FIBRE REINFORCED MATERIALS

FIELD OF THE INVENTION

The invention relates to a removable core which is composed of a foam material and is suitable for use in the production of tubular structures from fibre reinforced resin materials, and particularly to such a core which is hard and cross-sectionally dimensionally stable during the building of a tubular structure thereon, but softens or contracts under the action of heat during the subsequent curing of the resin material and thereby facilitates the removal of the core.

DESCRIPTION OF THE PRIOR ART

The use of foam material cores in the production of multi-walled rugged aircraft components—in particular with regard to helicopter rotors—is already familiar. In such cases the structures are assembled on the foam material core. The core is then removed (German patent specification No. 12 19 665). Foam material cores have a low flexural rigidity, which means that it is necessary to support the cores when applying the fibre reinforced materials. Furthermore, when conventional partitions are used they also have a rough surface which is then duplicated on the workpiece. Finally, it proves expensive to remove such a foam material core.

In another prior arrangement for the production of hollow bodies from fibre reinforced materials, cores are used which are composed of synthetic materials which can be brought by the action of internal pressure and heat into a given form which is retained after cooling. Reheating without internal support leads to the core contracting into its original form. Such cores must be designed with thick walls so that when the reinforcing fibres are applied the resultant forces can be absorbed (Austrian patent specification No. 189 793).

For the uninterrupted production of tubular bodies of fibre reinforced resin materials, a prior art arrangement is known (U.S. Pat. No. 3,113,897 and its equivalent German patent specification No. 11 92 396) in which a winding pin is provided which is composed of a eutectic metal alloy with a low melting point. On this continually extruded core the tubular fibre reinforced structure is applied and then removed. The free end of the core is thereby melted and the moten metal runs back inside the core tube. Such an arrangement is extraordinarily expensive.

The object of the invention is to create a foam material core which can also be used in the case of tubular structures of great extension in its length—that is to say, a high length to diameter ratio—and which can be removed without difficulty from the finished workpiece.

SUMMARY OF THE INVENTION

This problem is solved according to the invention in that the core composed of foam material is provided on the outside with a heat shrinking plastic tube or hose which serves as a coating.

Such a core is simple to produce, has a high rigidity and stability of shape and a smooth surface and can be removed without difficulty.

The invention is illustrated by way of example in the drawing and is subsequently described in detail with reference to the drawing.

DESCRIPTION OF THE PREFERRED EMBODIMENT

Figure 1:
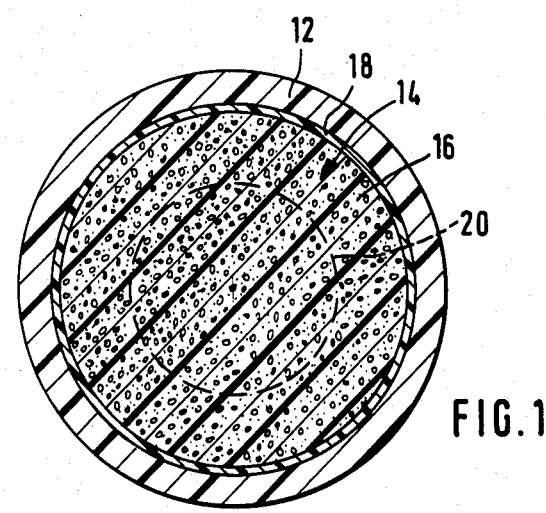
FIG. 1 shows a cross section through a tubular structure from a fibre reinforced material with a removable foam material core.

The core 14 shown in FIG. 1 features an inner core 16 which consists of a foam material, this inner core being covered on the outside with a heat shrinking plastic tube or hose 18, hereinafter called shrinking tube 18.

The inner core is composed of a foam material which confers a high stability of shape on the inner core at right angles to its longitudinal direction. The material of the foam material core is to be chosen in such a way that the foam material core softens or contracts under the action of heat. The inner core may for example be composed of a finely porous foam polystyrene, for instance a material which is sold under the trademark "ROOFMATE" by The Dow Chemical Company. The foam material core should have a precise geometrical shape as it is this which determines the shape of the tubular structure. The precise shape of the foam material core can be achieved for example by grinding.

In the production of the core, the inner core 16 which has been given the precise shape is introduced into a shrinking tube 18 and thus being covered by said shrinking tube, the size of which is chosen in such a way that partial shrinking causes it to come into close contact with the outer circumference of the inner core. The shrinking of the shrinking tube can be performed by guiding the core with the surrounding shrinking tube continuously through a source of heat which is preferably a ring shape heater. The shrinking tube is thus shrunk so that any inclusion of air is avoided. Said source of heat can of course also be moved relative to said core surrounded by said shrinking tube or hose the wall of which has a thickness in the order of 0.1 mm. The shrinking tube or hose is to be heated so that it assumes a temperature in the order of 100° C. Since the foam material core has a relatively high compressive strength at ambient temperature the strain of the shrinking tube after partial contraction is not critical. The shrinking tube 18 provides the core with a very smooth surface on the outside and also brings a high stability of shape to the core. The tubular structure 12 is then assembled from fibre reinforced materials on the surface in the usual manner and if necessary after the application of a release agent.

The shrinking tube 18 may for example be composed of a hard-setting polyvinyl choride. For the production of cores with an external diameter of 18 mm, a shrinking tube with a diameter of 27 mm and a wall thickness of 0.1 mm can be used. This is first contracted to the diameter of the foam material core.

Figure 2:
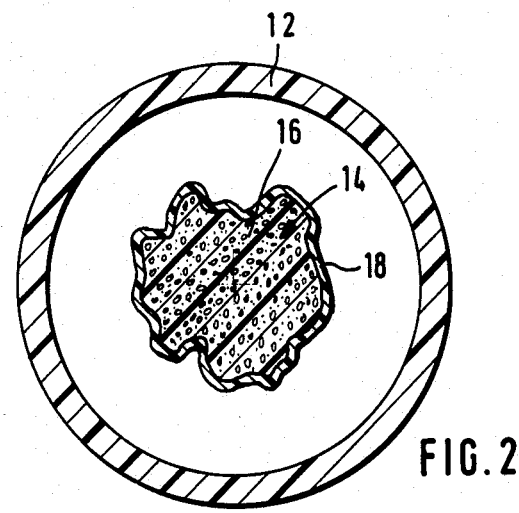
FIG. 2 is a schematic representation of the structure with the core having collapsed as a result of heat action.

After the tubular structure of fibre reinforced plastic material has been built on said core, said structure after a first curing of the resin at ambient temperature is heated up to a temperature in the order of 130° C. During this heating the resin is finally cured, the inner foam core softens and the shrinking tube of the core shrinks still further to its maximum extent, for instance to a diameter of some 13 mm. The shape of the core is then very uneven, corresponding more or less to that shown in FIG. 2.

The inner core 16 consisting of foam material can be a solid foam body. It is also possible to accord to it a hollow design as is shown in FIG. 1 by the circle represented by the broken line 20.

Cores similar to those described above can be straight, but can also be given a curved design. So after the first shrinking of the shrinking tube onto the foam core, for example, the core may be curved according to a shaping template. When the shrinking tube has cooled the core is stable with regard to its shape. The tubular structure from fibre reinforced materials applied on the core gets the shape of the core.

The core is deformed by heating it in the way described up to a temperature at which the foam material softens and/or collapses and is detached from the inner wall of the tubular structure. The collapsed core can thereafter be removed without difficulty even from curved or bent tubular structures. In the case of close bending radii it is advisable that the collapsed core be removed under heat, for example before the material of the shrinking tube cools and hardens again after the collapse of the core.

What I claim as my invention and desire to secure by Letters Patent of the United States is:

1. A removable core for use in the production of a tubular structure from a fibre reinforced resin material, said core comprising a body composed of a foam material which softens or collapses under the action of heat sufficient to cure the resin material but is hard and cross-sectionally dimensionally stable under less heat than that, and a plastic tube of heat-shrinkable material surrounding said body of foam material and heat-shrunk thereonto under heat less than that required for curing the resin material so as to closely embrace said body without deforming the same and to constitute therefor a coating which imparts to the core enhanced rigidity, dimensional stability, and a smooth outer surface, said tube being adapted to undergo further shrinkage during the application of heat to a tubular structure build up on said core sufficient to cure the resin material of said tubular structure, thereby to exert on the concomitantly softened foam material of said body compressive forces sufficient to decrease the cross-sectional dimensions of said body and enable removal of the core from said tubular structure.

2. A removable core according to claim 1 wherein said body of foam material is hollow.

* * * * *